United States Patent [19]

Brumby

[11] Patent Number: 5,065,859
[45] Date of Patent: Nov. 19, 1991

[54] CONVEYOR BELT SCRAPER

[75] Inventor: John A. Brumby, St. Austell, England

[73] Assignee: Ace Conveyor Equipment Limited, Nr Doncaster, England

[21] Appl. No.: 510,865

[22] Filed: Apr. 18, 1990

[30] Foreign Application Priority Data

Apr. 28, 1989 [GB] United Kingdom ............... 8909840

[51] Int. Cl.⁵ .......................................... B65G 45/00
[52] U.S. Cl. ................................... 198/499; 15/256.6
[58] Field of Search .......................... 198/497, 499; 267/141.1; 15/256.5, 256.51, 256.6

[56] References Cited

U.S. PATENT DOCUMENTS

| | | | |
|---|---|---|---|
| 3,631,968 | 1/1972 | Ward | 198/499 X |
| 3,656,610 | 4/1972 | McWilliams | 198/499 |
| 3,994,388 | 11/1976 | Reiter | 198/499 |
| 3,997,151 | 12/1976 | Leingang | 267/294 X |
| 4,053,045 | 10/1977 | Reiter | 198/499 |
| 4,105,109 | 8/1978 | Schultz | 198/499 |
| 4,189,046 | 2/1980 | Ward et al. | 198/499 |
| 4,286,777 | 9/1981 | Brown | 267/141.1 X |
| 4,694,952 | 9/1987 | Meijer | 198/499 |
| 4,754,868 | 7/1988 | Hughes et al. | 198/499 |
| 4,756,512 | 7/1988 | Toms, Jr. | 267/141.1 X |
| 4,968,010 | 11/1990 | Odobasic | 267/141.1 X |

FOREIGN PATENT DOCUMENTS

| | | | |
|---|---|---|---|
| 1227384 | 10/1966 | Fed. Rep. of Germany | 198/497 |
| 3624623 | 3/1987 | Fed. Rep. of Germany | 198/499 |
| 792516A | 3/1958 | United Kingdom . | |
| 1331222 | 9/1973 | United Kingdom | 198/499 |
| 1375413 | 11/1974 | United Kingdom | 198/499 |
| 1553210 | 9/1979 | United Kingdom | 198/499 |
| 2184084 | 6/1987 | United Kingdom | 198/499 |

Primary Examiner—D. Glenn Dayoan
Attorney, Agent, or Firm—Banner, Birch, McKie & Beckett

[57] ABSTRACT

A conveyor belt scraper of the type having at least one arm pivotally mounted to a fixed structure adjacent a movable conveyor belt, a scraper blade secured to a free end of the arm for contact with the belt in use of the scraper, and a stack of resilient elements for urging the arm to turn about its pivotal connection to the fixed structure whereby to press the scraper blade into contact with the belt, in which the stack of resilient elements is stressed in compression when the arm is turned in one direction about the pivotal connection to the fixed structure.

12 Claims, 4 Drawing Sheets

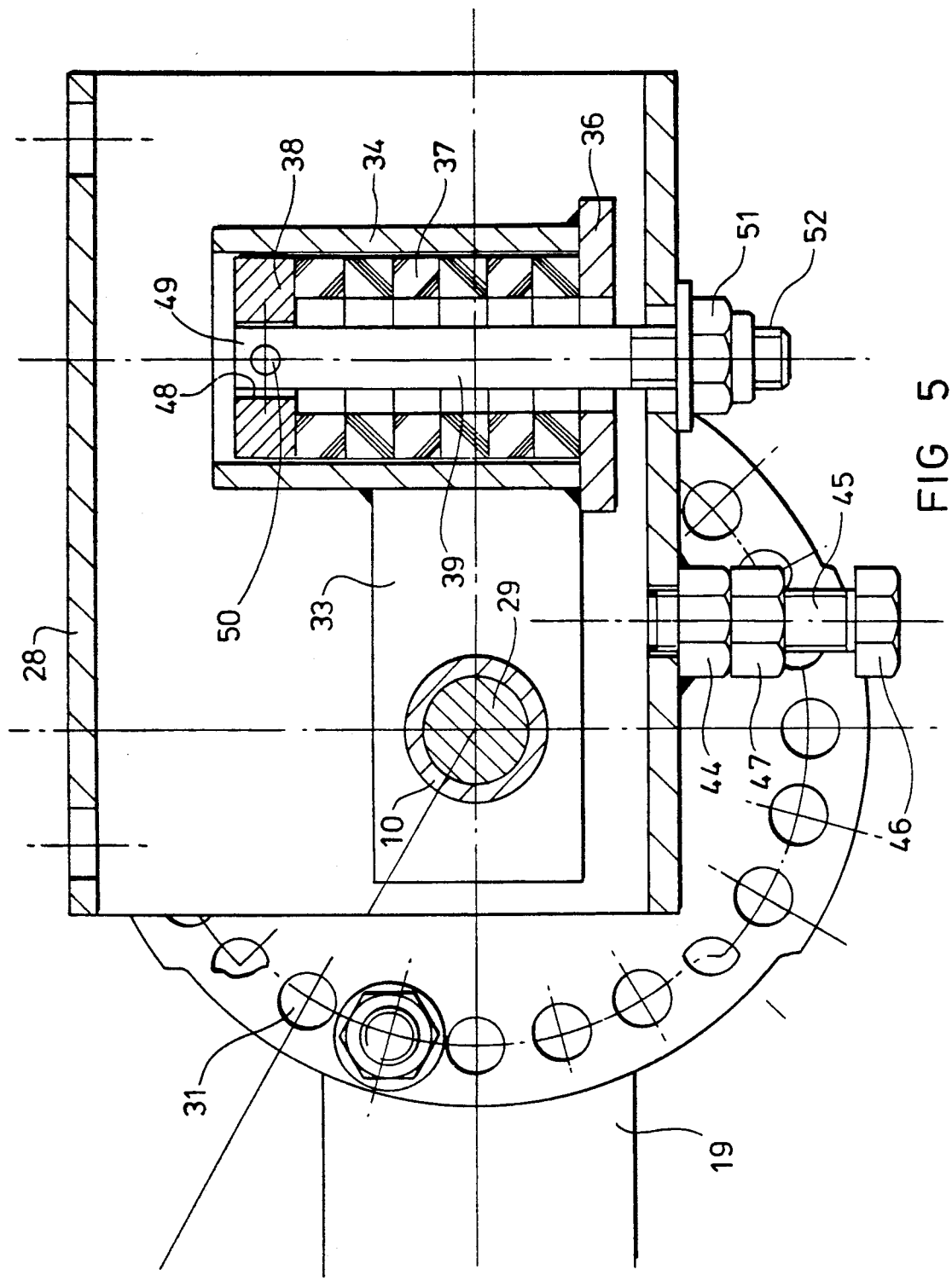

CONVEYOR BELT SCRAPER

BACKGROUND OF THE INVENTION

A requirement for scraper devices for conveyor belts arises in many fields of activity, particularly those of minerals processing and mining where irregularly shaped items of varying size, compacted with liquids such as to adhere to the belt have to be conveyed in a very aggressive environment. The conveyor belt scraper of the present invention generally comprises one or a plurality of lever arms pivotally mounted for turning movement about one end and carrying one or a plurality of scraper blades at the other, which arm or arms is or are resiliently biased to turn about the said pivot axis in order to bring the scraper blade into contact with a moving member such as a conveyor belt which is to be scraped. Such a scraper is particularly useful for scraping the return run of a conveyor belt used to convey crushed rock or minerals or other mining products such as coal all of which tend to form accumulations of small particles and moist dust coagulating on the surface of the conveyor belt which, in the absence of the scraper device of the present invention, would tend to accumulate on the belt itself.

Conveyor belt scrapers as such are known. One such scraper is described in UK Patent 1,553,210. This known scraper comprises two pivoted arms between which a scraper blade is carried, each arm being pivotally mounted to turn about a common pivot axis by respective torsion rubber bushes which are vulcanised or otherwise bonded between two rigid sleeves one fixedly connected to the arm to be pivoted and the other fixedly connected to a support structure. The known torsion rubber bush pivot and biasing constructions have the advantage over other known structures of being particularly compact and relatively easy to adjust, so that they can be used in locations where less compact structures cannot be fitted. They do have a major disadvantage, however, due to the fact that they are in use subjected to a dynamic stress pattern from fluctuations in the position of the conveyor belt as it moves, which tends to fatigue the bond between the rubber and the sleeves resulting, on occasion, in failure of this bond and consequent loss of torsion to the scraper blade support arms. Such failure is catastrophic in the sense that all biasing tension is completely lost once the bond is broken so that the scraper fails entirely in service.

Another disadvantage of the known torsion rubber bush biased scrapers lies in the relatively high expense involved in producing the torsion bushes which require special press equipment for assembly and vulcanisation. Although positional adjustment is relatively easy with the known devices it is not readily possible to vary the range of forces to which such devices may react, for example for the purpose of adapting the scraper for use on different belts of larger width which, because of this, would exert a higher force. Considerable modification to the length and/or diameter of the torsion bushes is required in order to accommodate such force variation and these, therefore, must be made for intended use within rather limited ranges.

OBJECTS OF THE INVENTION

A primary object of the present invention is to provide an improved conveyor belt scraper structure.

Another object of the present invention is to retain the advantages of compactness exhibited by the earlier known scraper device described above whilst avoiding the disadvantages associated with bond failure.

Yet another object of the present invention is to provide a conveyor belt scraper capable of being used even in the most corrosive environments with which the known torsion bush conveyor belt scraper has been used.

SUMMARY OF THE INVENTION

According to the present invention, therefore, a conveyor belt scraper of the type comprising at least one arm adapted to be pivotally mounted to a fixed structure adjacent a movable conveyor belt, a scraper blade secured to a free end of the arm for contact with the belt in use of the scraper, and resilient biasing means for urging the arm to turn about its pivotal connection to the fixed structure whereby to press the scraper blade into contact with the belt, is provided with resilient biasing means which comprise a stack of resiliently compressible elements stressed in compression when the arm is turned in one direction about the said pivotal connection.

The advantage of this structure over torsionally stressed structures lies in part in the economy with which resiliently compressible elements can be produced and assembled, and in part in the ease with which elements having a different surface area, and therefore different stress/strain characteristics can be produced within a relatively limited range of dimensions so that adaptations of the scraper device of the present invention can readily be made to fit the device for use in various different sets of circumstances where a wide range of different forces may be experienced.

Preferably there are provided two arms, one connected to each end of the scraper blade, although other configurations, perhaps incorporating a centralised arm mounted at an intermediate point along the scraper blade can be envisaged.

The said compressible elements of the resilient biasing means are conveniently annular discs. Other shapes, particularly polygonal or other regular shapes such as an H-shape may be used in special circumstances.

The said annular discs of the resilient biasing means are conveniently held in a stack by a stack casing which is preferably secured to a secondary arm of the scraper. The secondary arm may be turnable about the same pivot axis as the said main arm or arms thereof, but axially offset therefrom. In a preferred embodiment which will be described in more detail below the secondary arm is fixedly mounted to a pivot pin to which the said arms are likewise fixedly secured so that the two sets of arms turn about the axis of the pivot pin together by the same angle.

The said secondary arm or arms and the said stack casing are preferably located within a housing by which the said at least one arm is pivotally mounted to the said fixed structure adjacent a movable conveyor belt when the scraper is mounted for use.

In order to permit the scraper device to be fitted in a range of different configurations, for example with the said one arm trailing in relation to the direction of movement of the adjacent belt, and either above or below the path of the belt, or with the said one arm leading, and the housing mounted above the line of the belt (with the scraper blade scraping from below). A configuration with the said one arm leading and the housing below the belt line is not recommended since the scraper blade can, in this configuration, tend to bite into the belt rather than scrape across its surface. These various mounting configurations can be achieved by the provision of a disc-like element at the end or ends of the or each said arm to which the scraper blade is connected, the said disc-like element being located at the end of the said arm or arms remote from the connection to the scraper. The disc-like element and the said one arm or arms are turnable about the common pivot axis and may be secured together by any suitable means, for example such as a clamping bolt passing through aligned apertures.

The said housing within which the said secondary arm and the said slack casing are located is preferably provided with apertures through which an adjustment bolt projects by which the relative orientation of the housing and the arm or arms is adjustable. This adjustment bolt preferably passes through the stack of compressible resilient elements within the stack casing and is threadedly received into a rigid terminal element defining one end of the said stack and fixedly located in position with respect to the said stack casing.

In this embodiment the head end of the said adjustment bolt passes through an aperture in a transverse reaction member trapped between the said head end of the adjustment bolt and the housing.

The scraper blade may be adjustably mounted on the arm or arms by any suitable means. In a preferred embodiment a first screw threaded member is provided for adjusting the transverse inclination of the blade and clamping means are provided for fixing the blade in the adjusted position. Additionally, the scraper blade may be adjustable in inclination with respect to the said arm or arms on which it is carried. Such adjustment may be continuously variable or incremental. Means for adjusting the inclination by increments may comprise an array of holes in the arm and/or in the scraper blade or a member by which it is mounted to the arm.

The said annular resilient biasing elements are preferably polyurethane washers. For underground use a grade of polyurethane which is resistant to fire may be specified.

There may further be provided a position-locking member threadedly engaged in the said housing and engageable at one end with the said secondary arm whereby fixedly to determine the angular orientation thereof about the said pivot axis around which the secondary arm and the scraper blade carrier arm or arms is or are turnable.

Other features and advantages of the present invention will become apparent from a study of the following detailed description in which reference is made to the accompanying drawings provided purely by way of non-limitative example only.

BRIEF DESCRIPTION OF THE DRAWINGS

FIG. 5 is a sectional side view through a second embodiment of the invention.

DESCRIPTION OF THE PREFERRED EMBODIMENT

Figure 1:
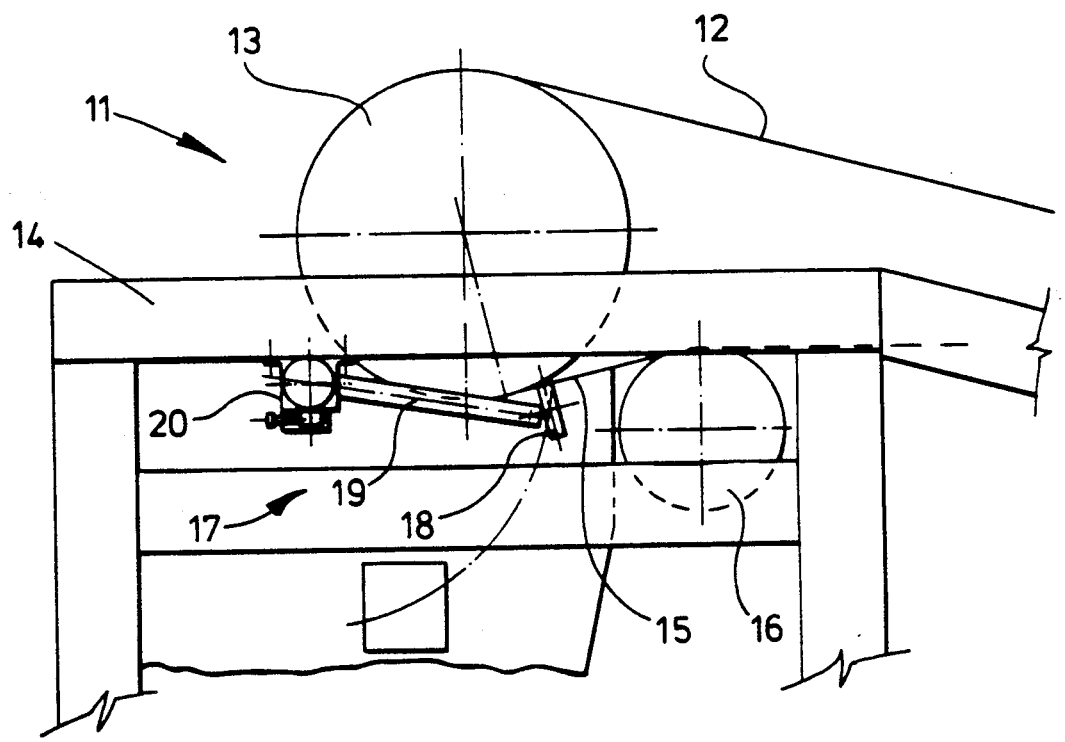
FIG. 1 is a schematic view illustrating the location of a belt scraper on a conveyor belt.

Referring now to the drawings, FIG. 1 illustrates a typical application of a belt scraper to a conveyor belt. In the drawing the belt conveyor is generally indicated 11 and shown schematically and only in part. The belt conveyor 11 comprises a conveyor belt 12 which passes over a conveyor belt end drum 13 carried on an end drum support frame 14.

Goods, minerals or other material are conveyed on the upper run of the conveyor belt 12 in a manner not shown, and a return run 15 of the conveyor belt, leading past an idler or tensioner roller 16 takes it back to another end drum at the other end of the conveyor path, and not shown in FIG. 1, for return movement along the conveyor path constituted by the upper run of the conveyor belt 12. Any material clinging or adhered to the conveyor belt is removed by a conveyor belt scraper generally indicated 17, comprising a scraper blade 18 mounted at the free end of a scraper lever arm 19 pivotally carried on an arm tensioner mount 20 the constitution of which will be described in more detail hereinbelow with reference to FIGS. 2, 3 and 4.

Figure 2:
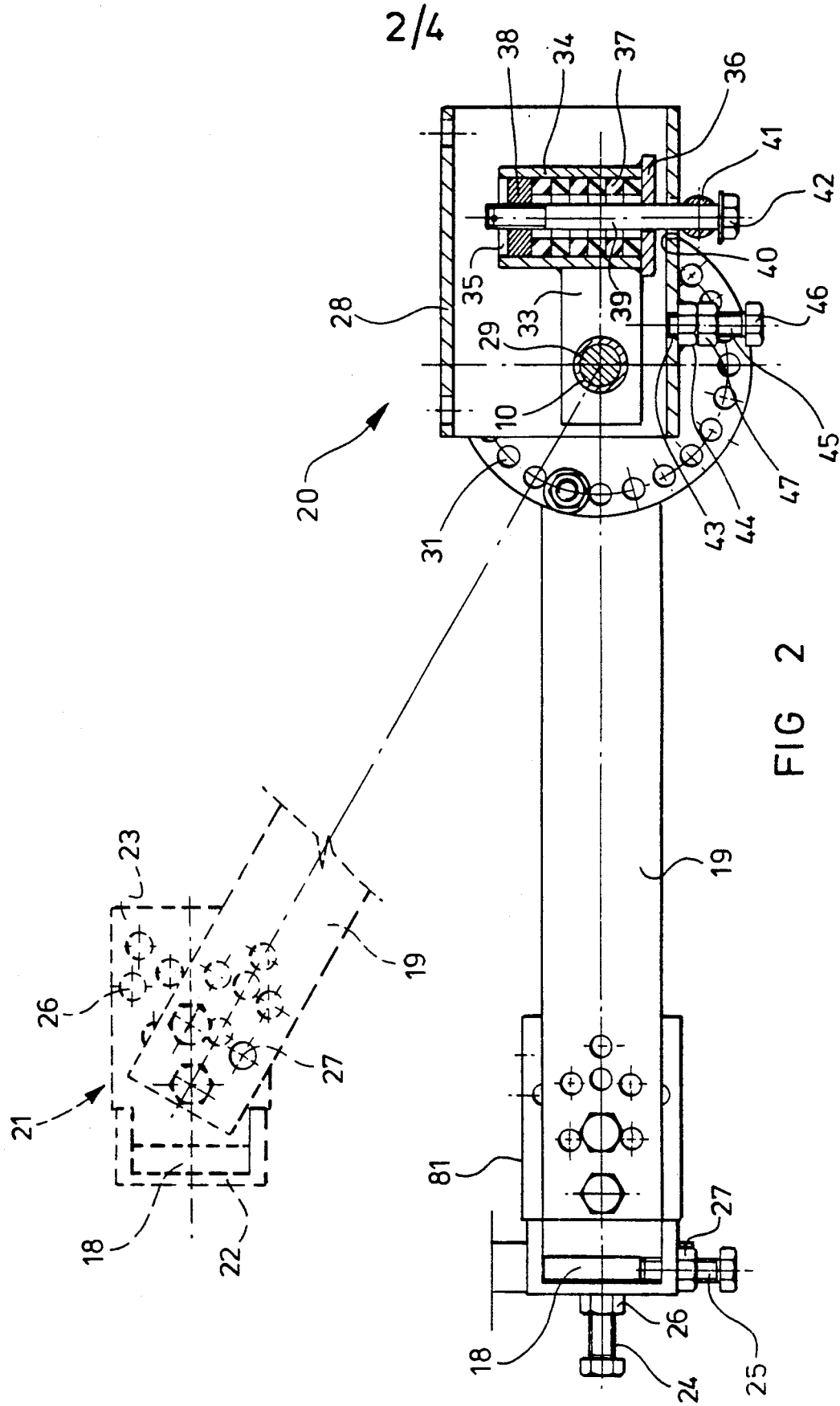
FIG. 2 is a partly sectioned side view of a belt scraper formed as an embodiment of the present invention.
Figure 3:
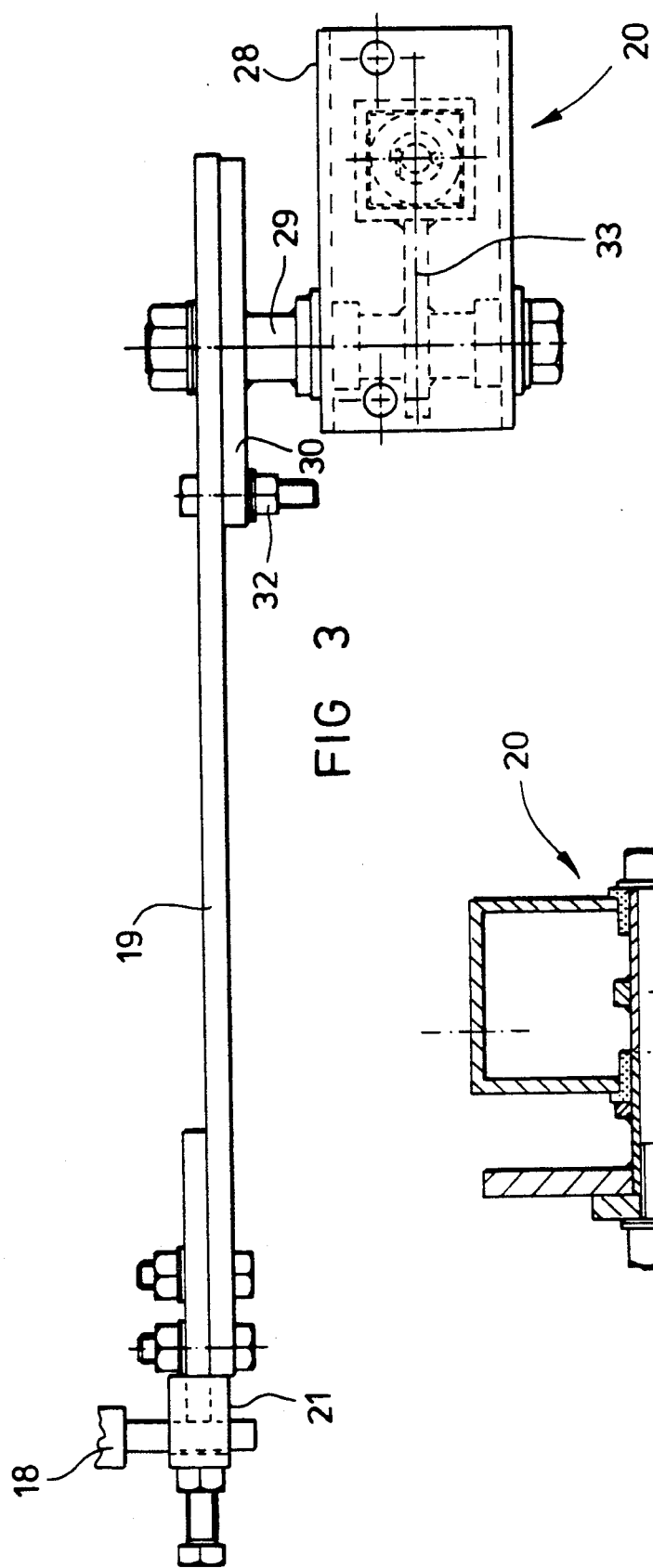
FIG. 3 is a plan view from above of the belt scraper of FIG. 2.
Figure 4:
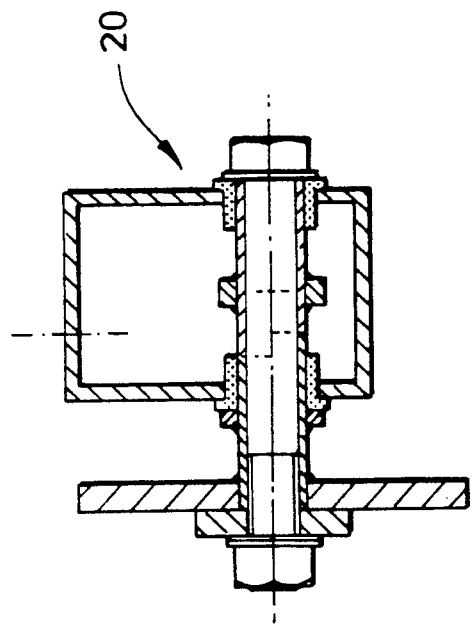
FIG. 4 is a sectional view of the belt scraper of FIG. 2 taken on the line IV—IV of FIG. 2.

Referring now to FIGS. 2, 3 and 4 the scraper blade 18 is shown fitted to the free end of the scraper lever arm 19 by a scraper blade carrier 21 comprising a generally U-shape blade carrier body 22 the arms of which are attached to a blade carrier mounting plate 23. The blade carrier body 22 has a clamping screw 24 passing through the bottom of the U-shape body, and a scraper blade adjustment screw 25 passing through one of the arms of the U-shape body 22. In each case, the two screws 24, 25, are threadedly engaged in respective nuts 26, 27 welded to the outer face of the blade carrier body to provide a sufficiently deep threaded engagement. In practice the belt scraper 17 comprises two such arms 19, one at each end of the scraper blade 18, and the adjustment effected by the screw 25 allows the scraper blade 18 to be adjusted to be exactly parallel to the conveyor belt 12. Once appropriate adjustment has been effected the clamping screws 24 are tightened to secure the scraper blade 18 in position on the scraper blade carrier 21.

Because the belt scraper may be mounted in various different positions for different applications, as indicated in FIG. 2, which shows two different angular inclinations of the arm 19, the scraper blade carrier mounting plate 23 is adjustable in inclination with respect to the arm 19 by means of a plurality of mounting plate holes 26 which can be aligned with selected corresponding lever arm holes 27 to set the scraper blade 18 at the required angle of attack to achieve an appropriate scraping action in dependence on its particular mounting arrangement.

The arm tensioner mount 20 provides both for the lever arm 19 to be attached to a fixed member such as the horizontal beam of the end drum support frame 14 illustrated in FIG. 1, or any other suitable fixed support and apply an appropriate force to the lever arm to maintain the scraper blade 18 in contact with the conveyor belt 12.

The arm tensioner mount 20 comprises a housing 28 which can be bolted or welded to the fixed frame member 14. The housing 28 is in the embodiment illustrated composed of a short length of boxed section steel tubing having aligned apertures in the two side walls thereof to receive a pivot pin 29 which extends through one side of the housing 28 and carries at its free end a lever arm carrier disc 30. The pivot pin 29 is borne in appropriate bearing bushes 10 in the side walls of the housing 28.

The arm carrier disc 30 has an annular array of holes 31 through which a lever arm clamping bolt can be passed to secure the lever arm 19 to the arm carrier disc 30 for common rotation about the axis defined by the pivot pin 29.

Within the housing 28 the pivot pin 29 is connected to a secondary arm 33 which lies parallel to, but axially offset from the lever arm 19. The secondary arm 33 is fixed to the pivot pin 29 so that it turns with the pivot pin 29 and thus with the lever arm 19 connected to the carrier disc 30. The free end of the secondary arm 33 is connected to a stack casing 34 which, as can be seen from FIG. 3, is a square section tubular member having an upwardly open end 35. The stack casing 34 is closed at its lower end by a stack casing floor 36. A stack of annular resilient compressible elements 37 is carried on the stack casing floor 36. Over the top most resilient element 37 is fitted a rigid terminal element 38 having the same cross-sectional shape, namely square, as the stack casing 34, and has central threaded aperture receiving a threaded end of a tensioner bolt 39 which passes through a corresponding aperture in the stack casing floor 36, an aperture 40 in the bottom wall of the housing 28 and a transverse reaction member 41 which is trapped between a head end 42 of the tensioner bolt 39 and the floor of the housing 28.

Adjacent the aperture 40 is a further aperture 43 aligned with which is welded a threaded nut 44 through which passes a locking bolt 45 having a hexagon head 46 and threadedly engaged on which is a lock nut 47.

When setting up the belt scraper of the present invention the lock nut 47 is slackened to allow the locking bolt 45 to be screwed in by engagement of a suitable key on the hexagon head 46 until the free end of the locking bolt 45 engages the secondary arm 33 to secure it in a selected position intermediate the ends of its range of turning movement about the pivot pin 29. The locking bolt 45 exerts a force on the secondary lever 33 tending to turn this in an anti-clockwise sense as viewed in FIG. 2, which carries the stack casing 34 away from the floor of the housing 28 drawing the head end 42 of the tensioner bolt 39 against the reaction member 41 and this, in turn, against the underside of the floor of the housing 28 lightly compressing the resilient elements 37 in the stack. The bolt 32 is then removed allowing the lever arm 19 to be turned with respect to the arm carrier disc 30 to move the free end of the arm carrying the scraper blade 18 into a position where the scraper blade 18 presses against the conveyor belt 12. The lever arm clamping bolt 32 is then reintroduced through whichever of the apertures 31 in the arm carrier disc 30 is aligned with the corresponding aperture in the arm 19 and tightened. The locking bolt 45 is then withdrawn and fixed in position by tightening of the lock nut 47 whilst the head end 42 of the tensioner bolt 39 is then rotated with a suitable key to draw the terminal element 38 towards the floor of the housing 28 to place the stack of annular resilient elements 37 under compression and cause a small clockwise rotation of the secondary arm 33, and consequently of the pivot pin 29 and the lever arm carrier disc 30 so that the lever arm 39 also turns, or tends to turn, clockwise to press the scraper blade 18 firmly against the conveyor belt 12. The stored energy in the compressed resilient elements 37 thus maintains the scraper blade 18 in contact with the belt 12 as this moves to one side or the other of its path during the operation of the conveyor belt as tension and other dynamic changes affect it.

The construction of the present invention has particular advantages in that it is compact, reliable, failsafe since, unlike the previous torsion bush configuration, there are no rubber-to-metal bonds which may fail in use, and can be adapted easily to different circumstances either by simply removing the tensioner bolt 39 to allow different compressible elements 37 to be placed in the stack, that is elements having a greater or lesser stiffness, or even to remove or add elements to achieve the required restoring force and range of movement. An extension of the range of available adjustments is simply achieved by replacing the stack casing 34 with one of larger or smaller cross-sectional area up to the maximum allowed by the internal dimensions of the housing 28. The annular elements 37 are separate from one another and therefore can be fitted into the stack casing 34 easily without requiring press tools or specialised equipment, and should they harden or become less resilient with age, replacement for fresh resilient elements can be achieved quickly, easily and at low cost. Any gradual hardening of the resilient elements 37 would not result in a catastrophic failure of the scraper belts, but rather no more than a gradual reduction in the force applied to the belt so that its scraping efficiency may become reduced but will not be lost altogether.

Referring now to FIG. 5, the second embodiment shown is broadly similar to the embdiment of FIGS. 1 to 4 and the same reference numerals are used to identify corresponding components. This embodiment differs from the previous embodiment, however, in that the terminal element 38, instead of being threaded has a plain hole 48 which receives an unthreaded end 49 of the tensioner bolt 39, which is retained in place by a transverse pin 50. The reaction member 41 is then dispensed with and replaced by a nut 51 screwed onto a threaded end 52 of the tensioner bolt. The nut 51 is illustrated as a self-locking nut.

What is claimed is:

1. In a conveyor belt scraper of the type comprising:
at least one arm adapted to be pivotally mounted by a pivotal connection to a fixed structure adjacent a movable conveyor belt;
a scraper blade secured to a free end of said arm for contact with the belt in use of the scraper; and
resilient biasing means for urging said arm to turn about its pivotal connection to said fixed structure whereby to press said scraper blade into contact with said belt, the improvement comprising:
said resilient biasing means comprising a stack of resiliently compressible elements stressed in compression when said arm is turned in one direction about said pivotal connection;
a stack casing, said resiliently compressible elements being held in a stack by said stack casing;
a secondary arm of said scraper;
means securing said stack casing holding said compressible elements of said resilient biasing means to said secondary arm of said scraper, and
a housing, said secondary arm and said stack casing being located within said housing, and said housing pivotally mounting said at least one arm to said fixed structure adjacent said movable conveyor belt.

2. The conveyor belt scraper of claim 1 wherein there are provided two arms, one connected to each end of said scraper blade.

3. The conveyor belt scraper of claim 1, wherein said compressible elements of said resilient biasing means are annular discs.

4. The conveyor belt scraper of claim 1, further including
   a pivot axis about which said arm is turnable, said secondary arm of the scraper being axially spaced along said pivot axis from said at least one arm, and
   means connecting said at least one arm and said secondary arm whereby said secondary arm is turnable about said pivot axis with said at least one arm.

5. The conveyor belt scraper of claim 1, wherein a disc-like element is mounted at the end of said at least one arm to which said scraper blade is connected, said disc-like member being located at the end of said arm remote from its connection to said scraper.

6. The conveyor belt scraper of claim 1, wherein there are apertures in said housing within which said secondary arm and said stack casing are located, and
   an adjustment bolt by which the relative orientation of said housing and said at least one arm is adjustable projecting through said apertures.

7. The conveyor belt scraper of claim 6 wherein said adjustment bolt passes through said stack of compressible resilient elements within said stack casing,
   a rigid terminal element defining one end of said stack and fixedly located in position with respect to said stack casing, and
   means threadedly receiving said adjustment bolt in said rigid terminal element.

8. The conveyor belt scraper of claim 6, wherein said adjustment bolt has a head end,
   a transverse reaction member trapped between said head end of said adjustment bolt and said housing,
   an aperture in said transverse reaction member, said head end of said adjustment bolt passing through said aperture in said transverse reaction member.

9. The conveyor belt scraper of claim 1, wherein said scraper blade is adjustable in position on said arm,
   a first screw threaded member for adjusting the position of said scraper blade on said arm, and clamping means for fixing the adjusted position of said scraper blade on said arm.

10. The conveyor belt scraper of claim 1, wherein said scraper blade is adjustable in inclination with respect to said arm on which it is carried,
    an array of holes in said arm,
    an array of holes in said scraper blade, and
    means for fixing said scraper blade in a selected inclination with respect to said arm by securing selected said arms in alignment.

11. The conveyor belt scraper of claim 3, wherein said annular resilient biasing elements are polyurethane washers.

12. The conveyor belt scraper of claim 6, wherein there is further provided a position-locking member threadedly engaged in said housing and engageable at one end with said secondary arm whereby to determine the angular orientation thereof about said pivot axis around which said secondary arm and said at least one arm are turnable.

* * * * *